Dec. 26, 1922.
C. HANSON.
COMBINED CHAIN FASTENER AND LINK.
FILED APR. 17, 1922.
1,440,076
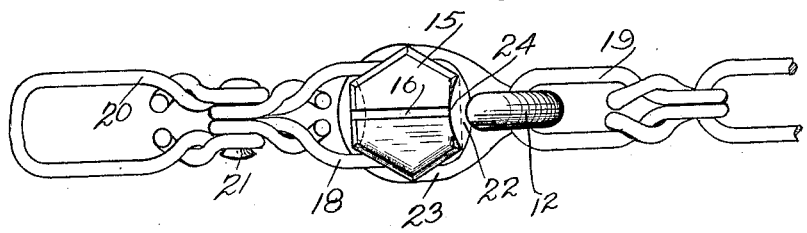
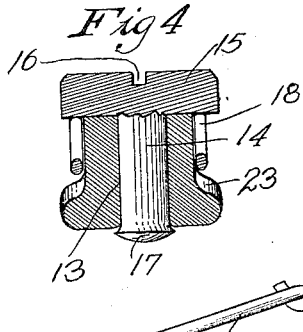
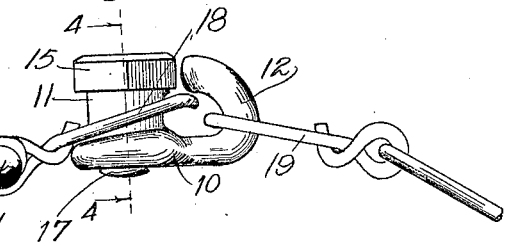
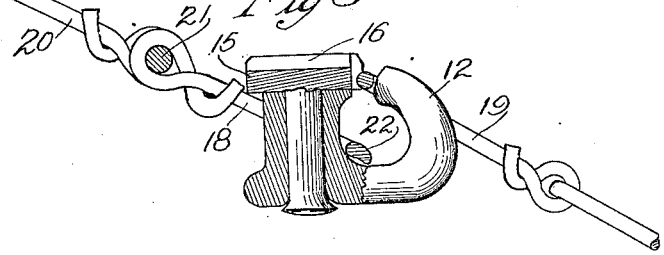
Inventor
Chris Hanson
By Bair & Freeman  Attorneys Patented Dec. 26, 1922.

1,440,076

UNITED STATES PATENT OFFICE.

CHRIS HANSON, OF FORT DODGE, IOWA.

COMBINED CHAIN FASTENER AND LINK.

Application filed April 17, 1922. Serial No. 553,865.

*To all whom it may concern:*

Be it known that I, CHRIS HANSON, a citizen of the United States, and resident of Fort Dodge, in the county of Webster, in the State of Iowa, have invented a certain new and useful Combined Chain Fastener and Link, of which the following is a specification.

The object of my invention is to provide a combined chain fastener and link of simple, durable and comparatively inexpensive construction.

More particularly my invention relates to a link arranged for securing the two ends of a chain together, the parts being so arranged that one end of the chain serves as a holding member for the other end of the chain.

Still another object is to provide a link fastener having a pair of projections formed thereon for engaging the end links of a chain, and a bolt member rotatably mounted on one of said projections and arranged when in one position to prevent the removal of either of the end links of the chain, and when in another position to permit the removal of one of the links.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a top plan view showing my link fastener.

Figure 2 is a side elevation of the same.

Figure 3 is a detailed, sectional view showing the links of the chain arranged in the position they are in when the parts are unfastened; and Figure 4 is a sectional view taken on line 4—4 of Figure 2.

My link fastener is preferably designed to be used for fastening the ends of a non-skid chain together for use on automobile wheels, and is an improvement upon my Letters Patent No. 1,408,998, dated March 7, 1922.

In the accompanying drawings, I have used the reference numeral 10 to indicate generally the body portion of my chain fastener, which is provided with a pair of projections 11 and 12. The projection 12 is curved so as to form a hook member. The upper ends of the projections 11 and 12 are spaced apart a sufficient amount to permit the links to be inserted therebetween.

Arranged within the projection 11 in an opening 13 is the bolt member 14 having the head 15 thereon. The head 15 is provided with a slot 16 so that a screw driver may be inserted therein when it is desired to rotate the bolt 14.

The lower end of the bolt 14 is battered, as at 17, so as to cause it to frictionally engage with the lower side of the body portion 10 of the device. The bolt 14 is so arranged that it will remain in any position that it is left in, unless some amount of effort is employed for rotating the bolt.

The lower end of the projection 12 where it meets the body portion 10, is arranged with a shoulder 23 which is inclined upwardly towards the projection 12, as clearly illustrated in Figure 2 of the drawings.

The end links 18 and 19 are extended over the projections 11 and 12 respectively. The link 18 is connected to a link 20 by means of a pintle rod 21. The remainder of the links of the chain are connected together in the ordinary manner.

The end of the link 18 is battered so as to form a wide portion 22, as shown in Figure 3 of the drawings in section. The link 18 is placed over the projection 11, and then the bolt member 14 is placed in position so that fastener device is always secured to one end of the chain.

The arrangement of the inclined shoulder 23 causes the link 18 to ordinarily rest upon the shoulder 23 in an inclined position. This causes the wide portion 22 to rest near the upper end of the projection 11, as shown in Figure 2 of the drawings.

The head 15 of the bolt 14 has one of its sides provided with a notch 24. When the notch 24 is arranged opposite from the end of the projection 12, there is sufficient space for permitting the link 19 to be slipped over the projection 12.

The rotation of the bolt member a half turn will cause the notch to no longer be spaced adjacent to the projection 12 and will cause the space between the projection 11 and 12 to be almost completely closed, preventing any accidental removal of the link 19.

When the link 19 is being placed in position over the projection 12, the link 18 is moved to position, as shown in Figure 3 of the drawings, so as to permit the link 19 to be slipped into position. As soon as the link 18 is returned to the position shown in Figure 2 of the drawings, which is the normal position, it will tend to form a closure member between the projections 11 and 12 and prevent the link 19 from being removed, even though the notch 24 is positioned adjacent to the end of the projection 12.

From the construction of the parts just described, it will be seen that the arrangement of the fastener device is such that the links themselves form a locking means for holding them in position against accidental removal.

It will also be seen that the bolt 14 forms a locking means when desired. The arrangement of the locking device is such that even though the operator forgets to rotate the bolt 14, the link 19 will still remain in fastened position.

It will be seen that when it is desired to remove the link 19 and the notch 12 is adjacent to the projection 12, all that is necessary is to incline the link 18 from the position shown in Figure 2, to the position shown in Figure 3, so that the space between the upper ends of the projections 11 and 12 is unobstructed.

When it is desired to fasten the link in position, the link 19 is first placed in the position shown in Figure 3 of the drawings and then moved to position shown in Figure 2. The link 18 is then moved from the position shown in Figure 3 to the position shown in Figure 2, which will practically be automatic, due to the inclined shoulder 23. The link 19 will then form a closure member for holding the link 19 against removal.

It will be seen that my device is very simple and is so arranged that it will serve as a fastener as soon as the ends of the chain are connected to the fastener device, even though the bolt 14 is not rotated.

Some changes may be made in the construction and arrangement of the various parts of my invention, without departing from the real spirit and purpose of my invention and it is my intention to cover by my claims, any modified forms of structure or use of mechanical equivalents, which may be reasonably included within their scope.

I claim as my invention:

1. A fastening link for chains comprising a body member having a pair of projecting portions formed at its ends, a shoulder formed at the lower end of one of said projecting portions, said projecting portions each being designed to have the ends of a chain placed thereover, an inclined shoulder on one of said projections, means mounted in one of said projections for preventing the removal of one end of the chain, the end link of one end of the chain being deformed and adapted to lie on the inclined shoulder so that it will close the greater portion between the projections and hold the other end of the chain against accidental removal as specified.

2. A fastening link for chains comprising a body member having a pair of projecting portions formed at its ends, a shoulder formed at the lower end of one of said projecting portions, said projecting portions each being designed to have the ends of a chain placed thereover, said shoulder being inclined so as to cause the end of the chain resting thereon to be inclined, means mounted in one of said projections for preventing the removal of one end of the chain; the end link of the chain resting upon said shoulder having a flattened portion so as to partly close the space between said projections and thereby prevent the removal of the end of the chain resting upon the other projection.

3. A fastening link for chains comprising a body member having a pair of projecting portions formed at its ends, said projecting portions being spaced apart sufficiently to permit a link of a chain to be received therebetween and extended over the projecting portions, an inclined shoulder formed at the lower end of one of the projecting portions on which the link of one end of the chain rests, said link having a flattened portion so that it will normally prevent the link of the opposite end of the chain from passing through between the two projecting portions as specified.

4. A fastening link for chains comprising a body member having a pair of projecting portions formed at its ends, said projecting portions being spaced apart sufficiently to permit a link of a chain to be received therebetween and extended over the projecting portions, an inclined shoulder formed at the lower end of one of the projecting portions on which the link of one end of the chain rests, said link having a flattened portion, said shoulder causing the link thereon to be inclined whereby the flattened portion will rest above the link on the other projection, the flattened portion of the link being designed to partly close the space between the projections.

Des Moines, Iowa, April 7, 1922.

CHRIS HANSON.